(12) United States Patent
Watanabe

(10) Patent No.: US 9,132,737 B2
(45) Date of Patent: Sep. 15, 2015

(54) ELECTROMOTIVE FORCE DEVICE

(75) Inventor: Atsushi Watanabe, Suntou-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 435 days.

(21) Appl. No.: 13/516,137

(22) PCT Filed: Dec. 24, 2009

(86) PCT No.: PCT/JP2009/071423
§ 371 (c)(1),
(2), (4) Date: Jun. 14, 2012

(87) PCT Pub. No.: WO2011/077528
PCT Pub. Date: Jun. 30, 2011

(65) Prior Publication Data
US 2012/0249061 A1 Oct. 4, 2012

(51) Int. Cl.
*H02J 7/00* (2006.01)
*B60L 11/12* (2006.01)
(Continued)

(52) U.S. Cl.
CPC ............... *B60L 11/123* (2013.01); *B60K 6/24* (2013.01); *B60K 6/46* (2013.01); *B60L 11/1861* (2013.01); *B60L 11/1868* (2013.01); *B60W 10/06* (2013.01); *B60W 10/08* (2013.01); *B60W 20/102* (2013.01); *B60W 20/106* (2013.01); *B60W 50/0097* (2013.01); *B60L 2210/30* (2013.01); *B60L 2210/40* (2013.01); *B60L 2240/441* (2013.01); *B60L 2240/545* (2013.01); *B60L 2240/547* (2013.01); *B60L 2240/549* (2013.01); *B60L 2240/62* (2013.01); *B60L 2240/622* (2013.01); *B60L 2240/80* (2013.01); *B60L 2260/44* (2013.01); *B60L 2260/54* (2013.01); *B60L 2260/58* (2013.01); *B60W 10/30* (2013.01); *B60W 2530/16* (2013.01);
(Continued)

(58) Field of Classification Search
USPC ......................................................... 320/132
See application file for complete search history.

(56) References Cited

U.S. PATENT DOCUMENTS 5,614,809 A 3/1997 Kiuchi et al.
5,621,304 A 4/1997 Kiuchi et al.
(Continued)

FOREIGN PATENT DOCUMENTS

JP  A-06-178405  6/1994
JP  A-06-197406  7/1994
(Continued)

OTHER PUBLICATIONS

International Search Report issued in International Application No. PCT/JP2009/071423 dated Mar. 23, 2010.
(Continued)

*Primary Examiner* — Eric Lee
(74) *Attorney, Agent, or Firm* — Oliff PLC

(57) ABSTRACT

Provided is an electromotive force device which is mounted to a hybrid vehicle or the like, causes an internal combustion engine to drive effectively, and thus make the vehicle travel efficiently. A start control device acquires a battery current output from a battery ammeter and a battery voltage output from a battery voltmeter in a set manual calculation period to calculate a battery average output. The start control device sets a start timing of a gas turbine on the basis of the battery average output calculated by a battery average output calculation unit and the current SOC calculated by a SOC calculation unit.

4 Claims, 13 Drawing Sheets

(51) Int. Cl.
*B60L 11/18* (2006.01)
*B60W 10/06* (2006.01)
*B60W 10/08* (2006.01)
*B60W 20/00* (2006.01)
*B60K 6/24* (2007.10)
*B60W 50/00* (2006.01)
*B60K 6/46* (2007.10)
*B60W 10/30* (2006.01)

(52) U.S. Cl.
CPC ...... *B60W 2710/244* (2013.01); *Y02T 10/6217* (2013.01); *Y02T 10/6291* (2013.01); *Y02T 10/6295* (2013.01); *Y02T 10/7005* (2013.01); *Y02T 10/7044* (2013.01); *Y02T 10/7066* (2013.01); *Y02T 10/7077* (2013.01); *Y02T 10/7241* (2013.01); *Y02T 10/7291* (2013.01); *Y02T 10/84* (2013.01); *Y02T 90/16* (2013.01); *Y02T 90/162* (2013.01)

(56) References Cited

U.S. PATENT DOCUMENTS

| | | | |
|---|---|---|---|
| 6,166,449 A | * | 12/2000 | Takaoka et al. ............ 290/40 B |
| 6,215,198 B1 | | 4/2001 | Inada et al. |
| 8,229,611 B2 | * | 7/2012 | Yamada ..................... 701/22 |
| 2009/0058326 A1 | | 3/2009 | Oyobe et al. |

FOREIGN PATENT DOCUMENTS

| | | |
|---|---|---|
| JP | A-08-061193 | 3/1996 |
| JP | A-08-065813 | 3/1996 |
| JP | A-09-233608 | 9/1997 |
| JP | A-10-014296 | 1/1998 |
| JP | A-10-150701 | 6/1998 |
| JP | A-2005-295711 | 10/2005 |
| JP | A-2007-062639 | 3/2007 |
| JP | A-2007-062640 | 3/2007 |
| JP | A-2007-176392 | 7/2007 |
| JP | A-2008-211955 | 9/2008 |

OTHER PUBLICATIONS

Aug. 16, 2012 International Preliminary Report on Patentability issued in International Patent Application No. PCT/JP2009/071423.

* cited by examiner

US 9,132,737 B2

ELECTROMOTIVE FORCE DEVICE

TECHNICAL FIELD

The present invention relates to an electromotive force device and particularly to an electromotive force device mounted to a hybrid vehicle or the like.

BACKGROUND ART

In recent years, hybrid vehicles in which an internal combustion engine is combined with a secondary battery as an electrical storage device and an electric motor have been vigorously developed as an environmental measure. As hybrid vehicles, there are a so-called series type and a parallel type. Among these, the series type hybrid vehicle uses the internal combustion engine for power generation and uses the electric motor for driving of the axle and regeneration.

As the series type hybrid vehicle, a hybrid automobile which controls a drive state of the internal combustion engine according to decreases in the charge amount of the secondary battery is conventionally known (for example, refer to Patent Literature 1). Such a hybrid automobile starts travelling from a state where the state of charge of the electrical storage device is higher than a control target and travels with the engine stopped until the state of charge reaches the control target. After the state of charge reaches the control target, the hybrid automobile travels using the engine and a motor generator.

CITATION LIST

Patent Literature

[Patent Literature 1] Japanese Unexamined Patent Application Publication No. 2007-62640

SUMMARY OF INVENTION

Technical Problem

When the state of charge (hereinafter, referred to as "SOC") of the secondary battery is low, this kind of series type hybrid vehicle is restricted from travelling, for example, by means of decelerating the vehicle. When the vehicle is restricted from travelling, the travelling performance of the vehicle cannot be sufficiently exhibited. However, the hybrid vehicle disclosed in Patent Literature 1 above is controlled such that the state of charge of the secondary battery remains according to the purpose when the hybrid arrives at the destination. Therefore, it is necessary to suppress the driving of the internal combustion engine, and the vehicle is restricted from travelling. As a result, there is a problem in that the hybrid vehicle cannot travel efficiently.

Therefore, an object of the present invention is to provide an electromotive force device which is mounted to a hybrid vehicle or the like, causes an internal combustion engine to drive effectively, and thus make the vehicle travel efficiently.

Solution to Problem

According to the present invention which solves the above-described problem, there is provided an electromotive force device which has an internal combustion engine generating electricity and supplies the electricity generated by the internal combustion engine to a secondary battery mounted to a vehicle, the device including: SOC acquisition means for acquiring the SOC of the secondary battery mounted to the vehicle; target SOC acquisition means for acquiring a target SOC when the vehicle is finished driving; necessary travelling power acquisition means for acquiring the necessary electrical power which is the electrical power necessary for the vehicle to travel; electromotive force value acquisition means for acquiring an electromotive force value of the internal combustion engine; and charge start timing determination means for determining a start timing for the internal combustion engine to charge the secondary battery, in which the charge start timing determination means determines the charge start timing on the basis of the SOC of the secondary battery acquired by the SOC acquisition means, the target SOC acquired by the target SOC acquisition means, the necessary electrical power acquired by the necessary travelling power acquisition means, and the electromotive force value of the internal combustion engine acquired by the electromotive force value acquisition means.

In the electromotive force device according to the present invention, the charge start timing is determined on the basis of the SOC of the secondary battery acquired by the SOC acquisition means, the target SOC acquired by the target SOC acquisition means, the necessary electrical power acquired by the necessary travelling power acquisition means, and the electromotive force value of the internal combustion engine acquired by the electromotive force value acquisition means. As a result, the charge start timing is determined according to the state of charge of the secondary battery or the electrical power necessary for hybrid travel. Therefore, by mounting the electromotive force device to the hybrid vehicle or the like, the internal combustion engine can be effectively driven and thus the vehicle can travel efficiently.

Here, according to an aspect, required average output acquisition means for acquiring an average output required for the vehicle can be further provided, in which the necessary travelling power acquisition means acquires the necessary electrical power for travelling on the basis of the average output required for the vehicle. As described above, the necessary electrical power for the vehicle to travel can be acquired on the basis of the required average output of the required average output in the vehicle.

At this time, according to an aspect, a threshold can be set for the relationship between the required average output and the SOC on the basis of the target SOC and the electromotive force value of the internal combustion engine, and the charge start timing determination means can determine a timing when the relationship between the required average output and the SOC exceeds the threshold, as the charge start timing. According to the aspect, the charge start timing can be easily and reliably determined.

According to an aspect, secondary battery average output acquisition means for acquiring a secondary battery average output value which is the average output of the secondary battery, can be further provided, in which the necessary travelling power acquisition means acquires the necessary electrical power for travelling on the basis of the secondary battery average output. As described above, the necessary electrical power for the vehicle to travel can be acquired on the basis of the secondary battery average output of the required average output in the vehicle.

At this time, according to an aspect, a threshold can be set for the relationship between the secondary battery average output and the SOC on the basis of the target SOC and the electromotive force value of the internal combustion engine, and the charge start timing determination means can determine a timing when the relationship between the secondary battery average output and the SOC exceeds the threshold, as the charge start timing. According to the aspect, the charge start timing can be easily and reliably determined.

In addition, according to an aspect, the secondary battery average output can be a value of a current output from the secondary battery. As described above, the secondary battery average output is preferably the value of the current output from the secondary battery.

Furthermore, according to an aspect, road information acquisition means for acquiring road information up to a charging area where the secondary battery can be charged from the outside of the vehicle, can be further provided, in which the charge start timing determination means adjusts a charge timing according to the road information acquired by the road information acquisition means.

As described above, by adjusting the charge timing according to the road information acquired by the road information acquisition means, the future state of charge of the secondary battery can be predicted. Therefore, the internal combustion engine can be more effectively driven and the vehicle can travel efficiently.

In addition, according to an aspect, electrical power consumption plan generating means for generating an electrical power consumption plan for up to arriving at the charging area on the basis of the road information acquired by the road information acquisition means, can be further provided, in which the charge start timing determination means adjusts the charge start timing on the basis of the electrical power consumption plan.

As described above, by generating the electrical power consumption plan and adjusting the charge start timing on the basis of the electrical power consumption plan, the future state of charge can be more effectively predicted, the internal combustion engine can be more effectively driven, and the vehicle can travel efficiently.

Furthermore, according to an aspect, travelling restriction means for restricting the vehicle from travelling when the SOC of the secondary battery acquired by the SOC acquisition means reaches a predetermined travelling restriction start SOC, can be further provided, in which the charge start timing determination means adjusts the charge start timing according to a tolerance when the SOC of the secondary battery falls below the travelling restriction start SOC.

As described above, by adjusting the charge start timing according to the tolerance when the SOC of the secondary battery falls below the travelling restriction start SOC, the energy amount of the secondary battery which is used until the vehicle arrives at a destination can be made to be large. Therefore, the vehicle can travel efficiently while suppressing as far as possible the internal combustion engine from driving.

In addition, according to an aspect, the charge start timing determination means can adjust the charge start timing in a range where the SOC of the secondary battery is equal to or higher than the travelling restriction start SOC.

As described above, by adjusting the charge start timing in a range where the SOC of the secondary battery is equal to or higher than the travelling restriction start SOC, the vehicle can travel without being restricted from travelling. Therefore, the energy can be efficiently used.

Furthermore, according to an aspect, the vehicle can be provided with a charge start switch which can be manipulated by a passenger, and the charge start timing determination means can preferentially determine a timing when the charge start switch is switched on, as the charge start timing.

As described above, by determining timing when the charge start which can be manipulated by the passenger is switched on as the charge start timing, the charge start timing can be determined according to the intention of the passenger.

There can be provided a hybrid vehicle including any one of the above-described electromotive force devices, the secondary battery, and an electric motor that drives a drive wheel using electricity supplied from the secondary battery.

Advantageous Effects of Invention

The electromotive force device according to the present invention can be mounted to a hybrid vehicle or the like, cause an internal combustion engine to drive effectively, and thus make the vehicle travel efficiently.

Figure 7:
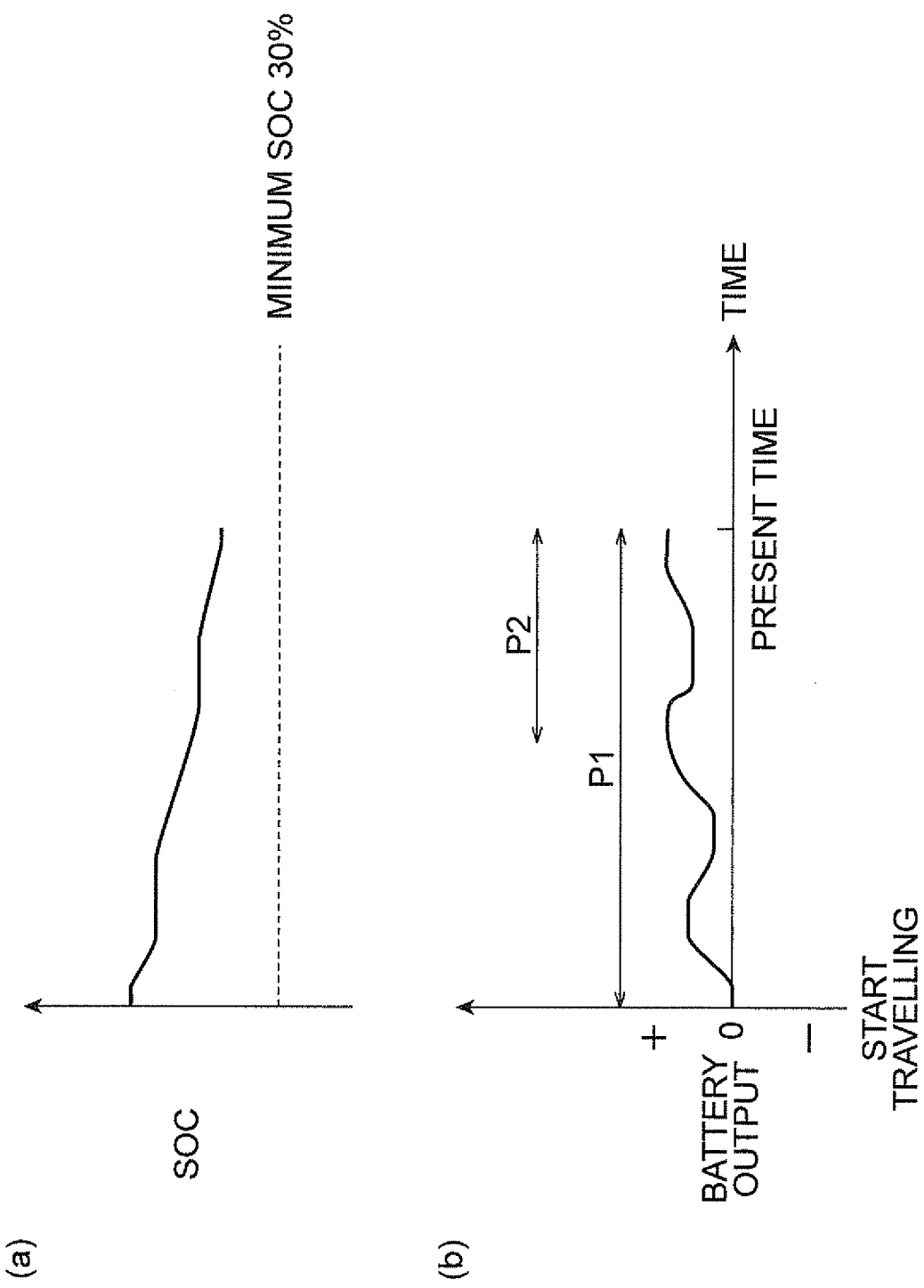

(a) of FIG. 7 is a graph illustrating the change over time of an SOC, and (b) is a graph illustrating the change over time of battery output.

Figure 8:
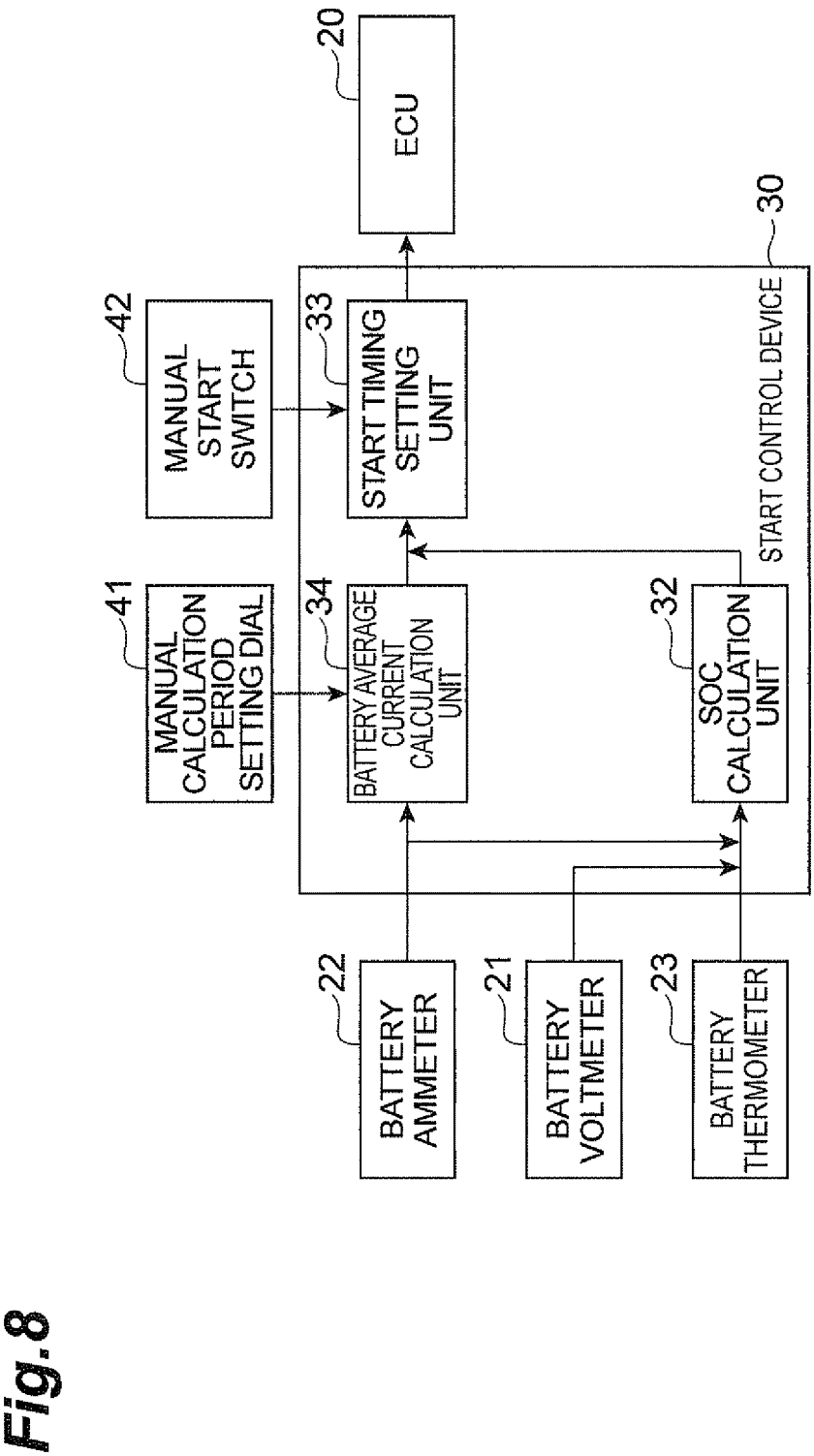

FIG. 8 is a block diagram illustrating a configuration of a start control device of an electromotive force device according to a second embodiment.

Figure 9:
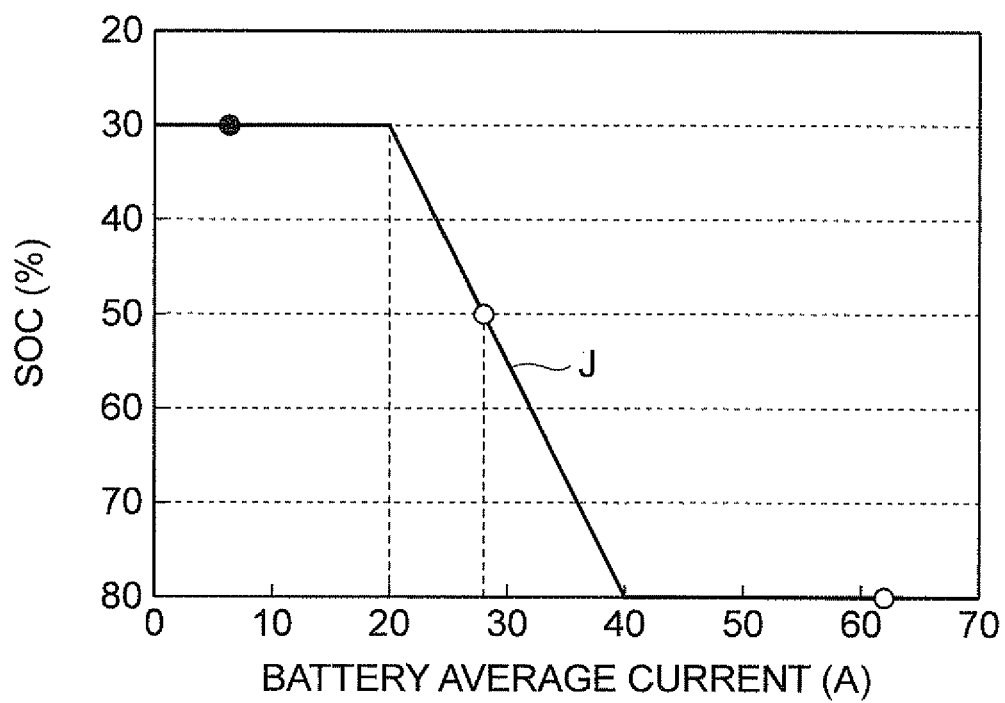

FIG. 9 is a graph illustrating a start timing setting map in the electromotive force device according to the second embodiment.

Figure 10:
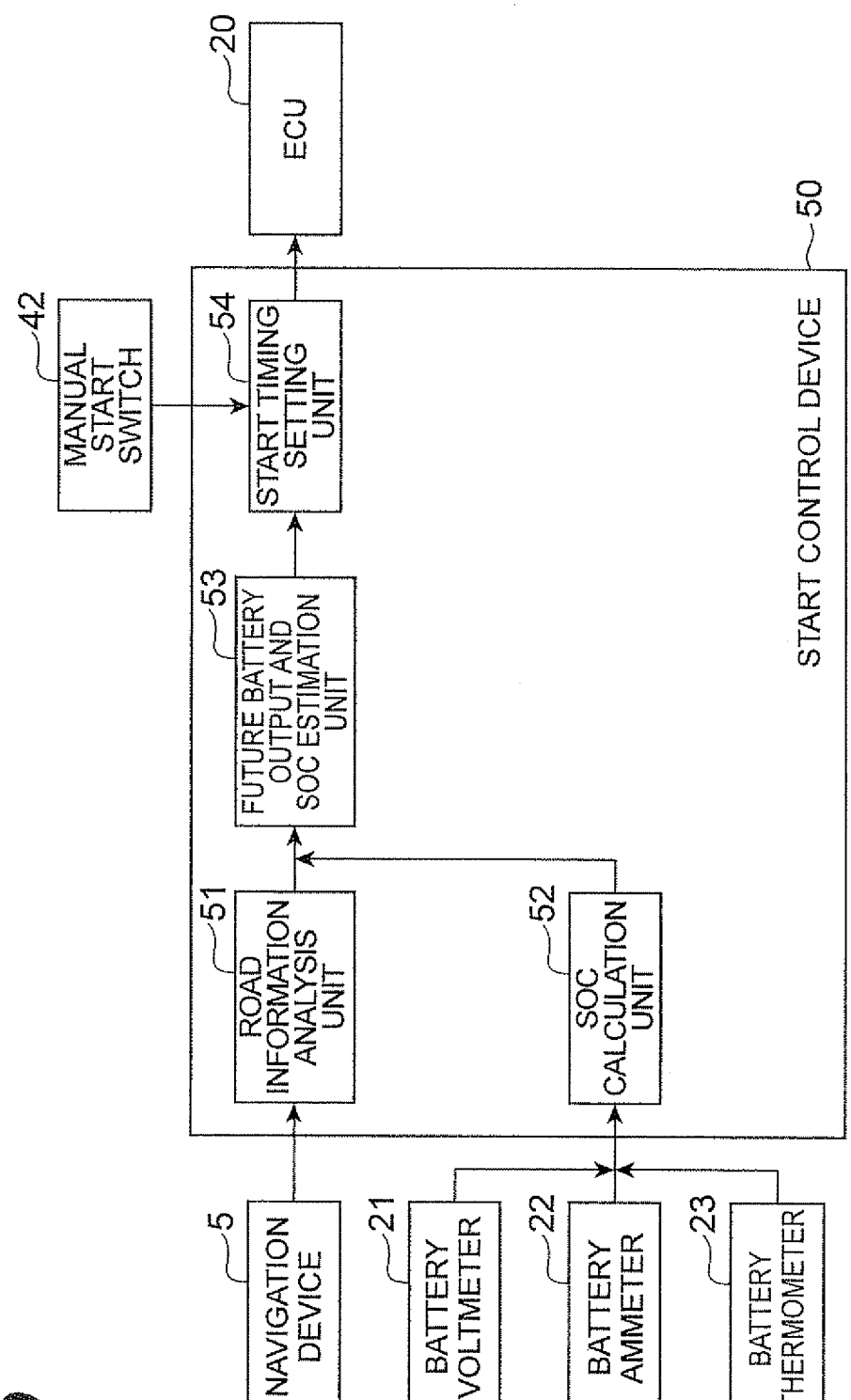

FIG. 10 is a block diagram illustrating a configuration of a start control device of an electromotive force device according to a third embodiment.

Figure 11:
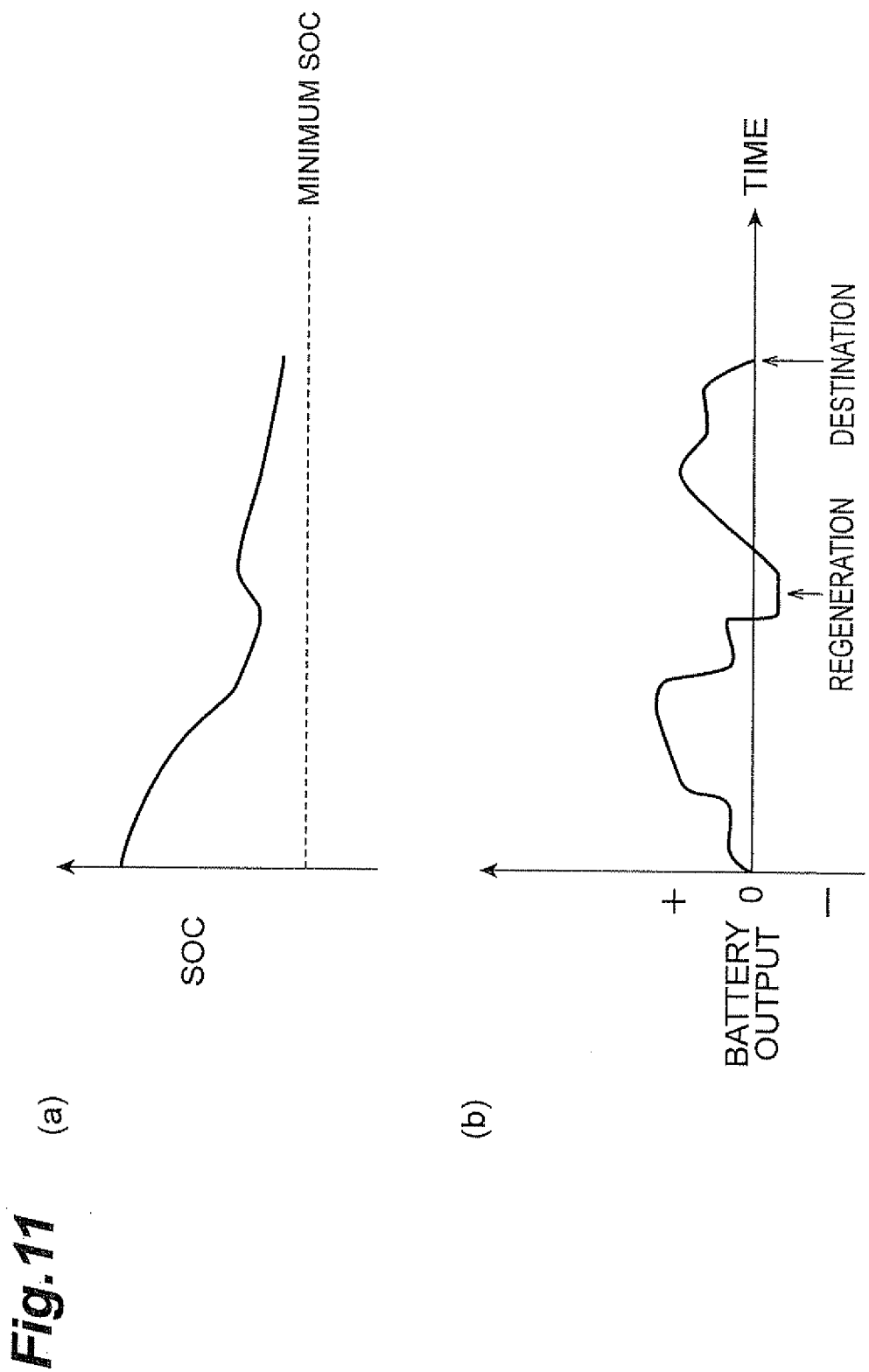

(a) of FIG. 11 is graph illustrating the change over time of a SOC in a case where the SOC at a destination of a travel plan is not the minimum SOC, and (b) is a graph illustrating the change over time of battery output thereof.

Figure 12:
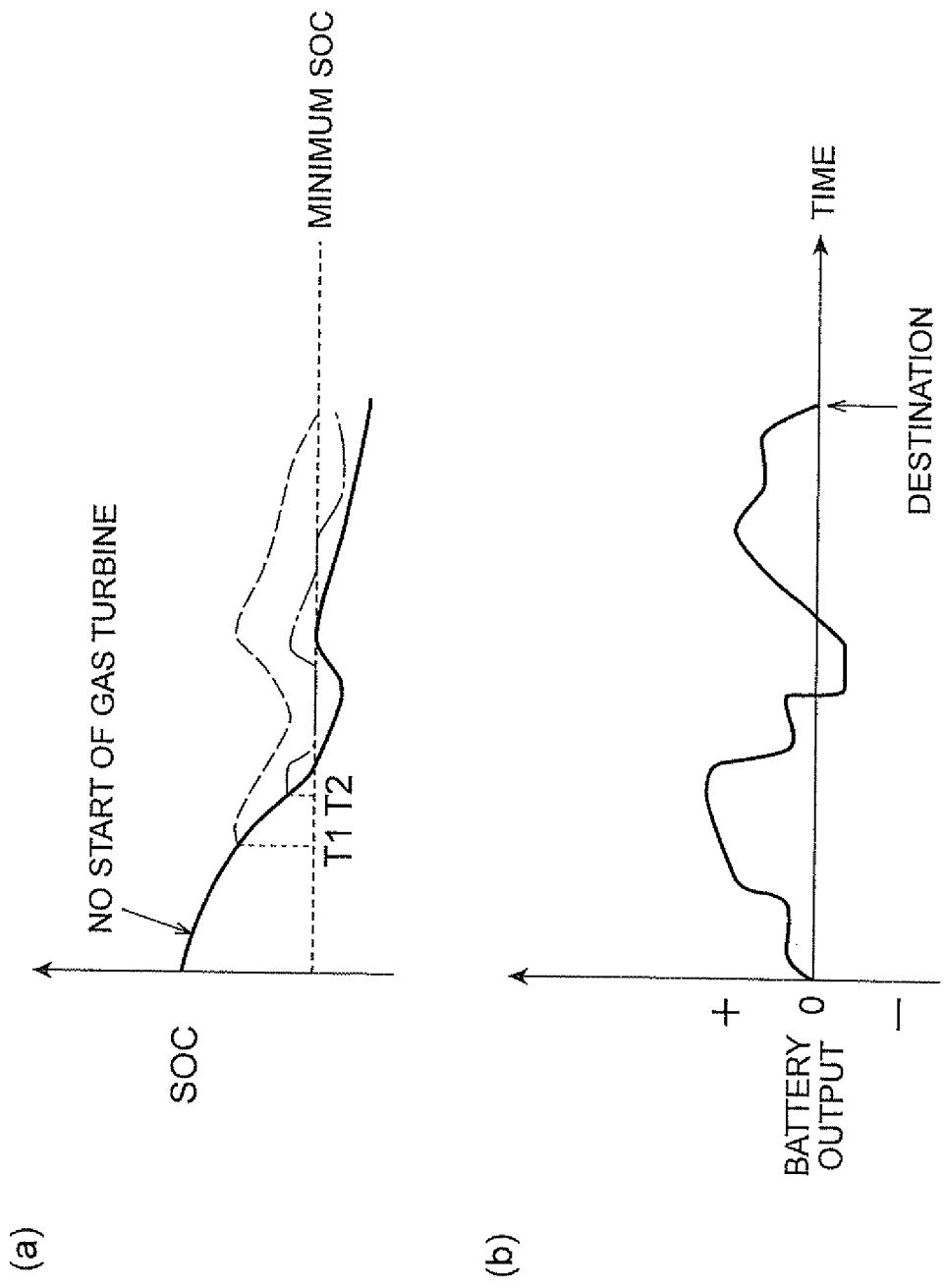

(a) of FIG. 12 is graph illustrating the change over time of a SOC in a case where the SOC at a destination of a travel plan is the minimum SOC, and (b) is a graph illustrating the change over time of battery output thereof.

Figure 13:
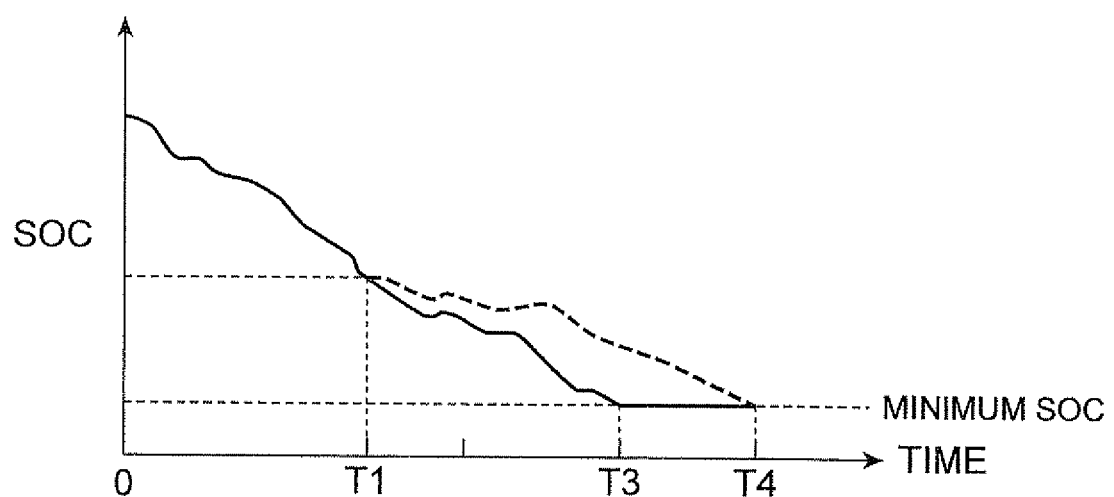

FIG. 13 is a graph illustrating the change over time of a SOC in a case where the SOC at a destination reaches the minimum SOC by advancing a start timing of a gas turbine.

DESCRIPTION OF EMBODIMENTS

Hereinafter, embodiments according to the present invention will be described with reference to the accompanying drawings. Here, in the description of the drawings, the same reference signs are applied to the same components, and repeated description will be omitted. In addition, for the convenience of illustrating the drawings, the dimension ratios in the drawings do not necessarily match those described in the specification.

Figure 1:
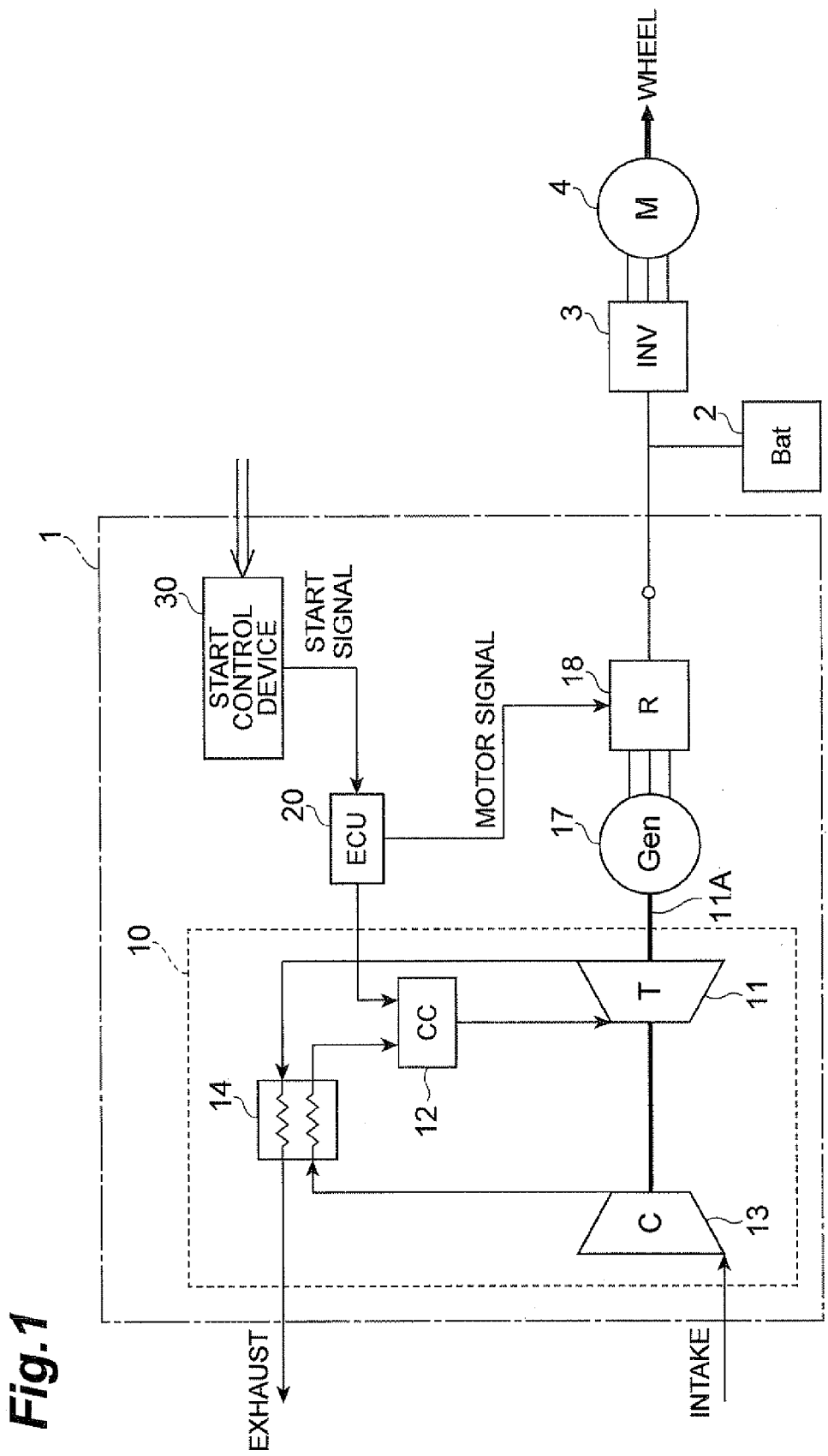
FIG. 1 is a diagram illustrating a configuration of a vehicle including an electromotive force device according to an embodiment of the present invention.
Figure 2:
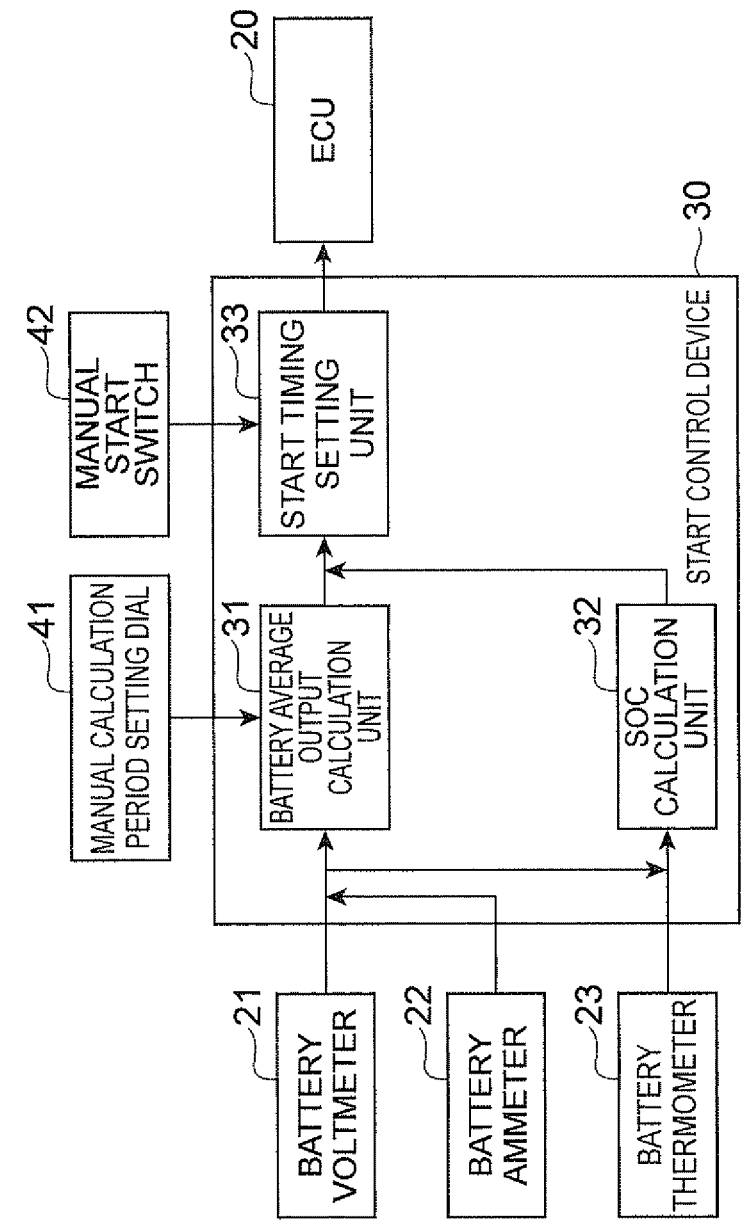
FIG. 2 is a block diagram illustrating the configuration of the electromotive force device according to the present embodiment.

First, a first embodiment of the present invention will be described. FIG. 1 is a diagram illustrating a configuration of a vehicle including an electromotive force device according to the present embodiment. FIG. 2 is a block diagram illustrating the configuration of the electromotive force device according to the present embodiment. As illustrated in FIG. 1, a hybrid vehicle includes an electromotive force device 1. In addition, a battery 2 as a secondary battery is connected to the electromotive force device 1. A motor 4 as an electric motor is connected to the electromotive force device 1 and the battery 2 through an inverter 3. The motor 4 is connected to a wheel (not illustrated). By driving the motor 4, the wheel rotates and the hybrid vehicle travels. In addition, the motor 4 charges the battery 2 with electricity generated by regeneration.

The electromotive force device 1 includes a gas turbine 10 as an internal combustion engine. The gas turbine 10 includes a turbine 11. A combustor 12 is connected to the turbine 11 and a compressor 13 is connected to the combustor 12. The compressor 13 suctions the external air and supplies the compressed air to the combustor 12. The compressor 13 is directly connected to the turbine 11 and supplies the power to the compressor by the rotation of the turbine 11. This gas turbine 10 generates 10 kW of electrical power at rated output.

The combustor 12 combusts the supplied compressed air to generate a high-temperature and high-pressure gas. The high-temperature and high-pressure gas generated by the combustion of the compressed air is supplied from the combustor 12 to the turbine 11. The turbine 11 is rotated by the high-temperature and high-pressure gas. The gas which has rotated the turbine is exhausted from the turbine 11 as an exhaust gas.

Furthermore, the gas turbine 10 is provided with a heat exchanger 14. The heat exchanger 14 performs the heat exchange between the compressed air which is supplied to the combustor 12 by the compressor 13 and the exhaust gas which is exhausted from the turbine 11, thereby heating the compressed air and cooling the exhaust gas. The exhaust gas which is heat-exchanged by the heat exchanger 14 is output as is.

Furthermore, the electromotive force device 1 is provided with a power generator 17 and a rectifier 18. A rotating shaft 11A is connected to the turbine 11 of the gas turbine 10. The power generator 17 is connected to the rotating shaft 11A of the gas turbine 10. The rotation of the turbine 11 is transmitted to the power generator 17 through the rotating shaft 11A. The power generator 17 generates electricity through the rotation of the turbine 11.

The electricity generated by the power generator 17 is alternating current. The electricity converted into direct current by the rectifier 18 is supplied from the rectifier 18 to the battery 2 and the inverter 3. In addition, the direct current is also supplied from the battery 2 through the inverter 3. The inverter 3 converts the direct current supplied from the rectifier 18 and the battery 2 into the alternating current and supplies the alternating current to the motor 4.

Furthermore, the electromotive force device 1 includes an ECU (Electronic Control Unit) 20. A start control device 30 is connected to the ECU 20. In addition, the ECU 20 is connected to the combustor 12 and the rectifier 18. When a start signal is transmitted from the start control device 30, the ECU 20 transmits a motor signal to the rectifier 18 and operates the rectifier 18 as an inverter. By operating the rectifier 18 as an inverter, the alternating current voltage is applied to the power generator 17 using the electrical power of the battery 2 as an input and the gas turbine 10 starts using the power generator 17 as a motor. As described above, timing when the start control device 30 transmits the start signal and the ECU 20 receives this start signal is charge start timing according to the present invention.

At the same time, the ECU 20 controls the fuel flow rate to be supplied to the gas turbine 10 and accelerates the gas turbine 10 to increase the rotating speed up to rated speed. When the rotating speed of the gas turbine 10 is about half of the rated speed, the rectifier 18 stops the activation of the power generator 17. When the rotating speed of the gas turbine 10 is the rated speed, the ECU 20 controls the fuel flow rate to operate the gas turbine 10 at the rated output and thus the power generator 17 generates the power.

On the other hand, a battery voltmeter 21, a battery ammeter 22, and a battery thermometer 23 are attached to the battery 2. In addition, as illustrated in FIG. 2, the start control device 30 of the electromotive force 1 includes a battery average output calculation unit 31, a state of charge (SOC) calculation unit 32, and a start timing setting unit 33. Furthermore, a manual calculation period setting dial 41 and a manual start switch 42 are provided in the vicinity of a driver seat of a hybrid vehicle.

The battery voltmeter 21, the battery ammeter 22, and the manual calculation period setting dial 41 are connected to the battery average output calculation unit 31. The manual calculation period setting dial 41 can set the measurement time of a battery current and a battery voltage so as to calculate a battery average output.

The battery average output calculation unit 31 calculates the battery average output using the battery voltage transmitted from the battery voltmeter 21 and the battery current transmitted from the battery ammeter 22 at a time set by the manual calculation period setting dial 41. The battery average output calculation unit 31 outputs the calculated battery average output to the start timing setting unit 33.

The battery voltmeter 21, the battery ammeter 22, and the battery thermometer 23 are connected to the SOC calculation unit 32. The SOC calculation unit 32 calculates the SOC of the battery on the basis of the battery voltage measured by the battery voltmeter 21, the battery current measured by the battery ammeter 22, and the battery temperature measured by the battery thermometer 23. The SOC calculation unit 32 outputs the calculated SOC of the battery 2 to the start timing setting unit 33.

Figure 3:
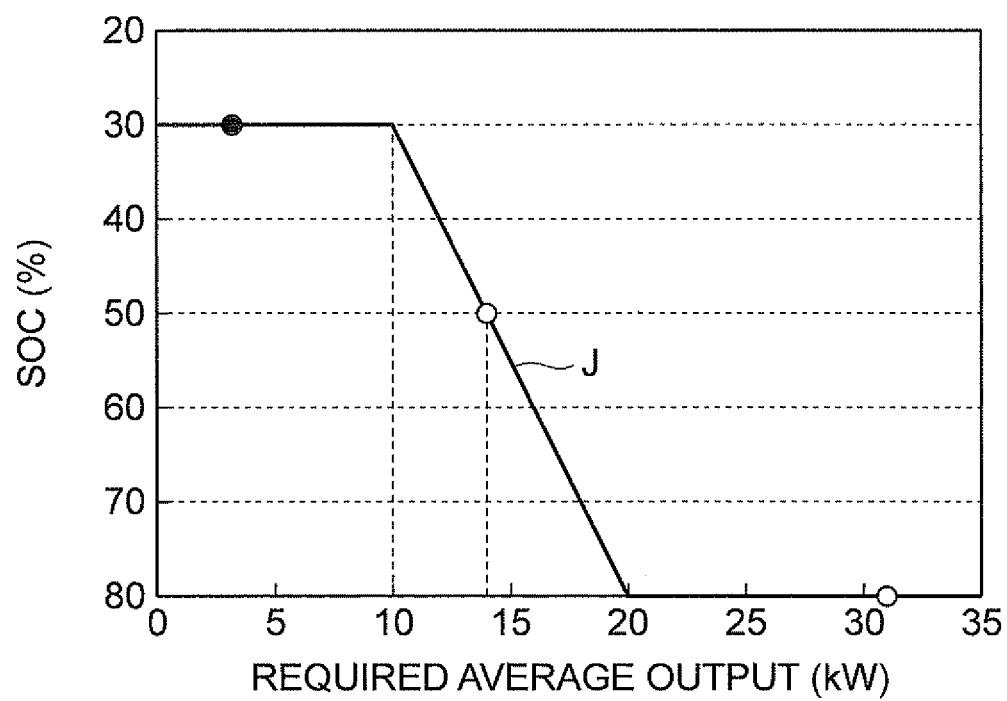
FIG. 3 is a graph illustrating a start timing setting map.

The start timing setting unit 33 stores a start timing setting map illustrated in FIG. 3. The start timing setting map includes a determination reference line J for determining whether or not a timing is the start timing. When a point plotted by the required average output and the SOC is on the upper right side from the determination reference line J, it is determined that the gas turbine 10 should start.

In addition, the start timing setting unit 33 acquires the required average output on the basis of the battery average output which is output from the battery average output calculation unit 31. In the present embodiment, the battery average output is used as the required average output as is. The start timing setting unit 33 sets the start timing of the gas turbine 10 by referring the acquired required average output and the current SOC of the battery 2 output from the SOC calculation unit 32 to the start timing setting map. At this time, when the SOC of the battery 2 is a predetermined minimum SOC, the gas turbine 10 automatically starts.

In addition, when the manual start switch 42 is switched on, the gas turbine 10 starts preferentially at the set start timing. The start timing setting unit 33 sets the start timing and then transmits the start signal to the ECU 20 at the start timing. In addition, the start signal is also transmitted to the ECU 20 at the automatic start.

Furthermore, when the SOC of the battery 2 is in the minimum state, the start control device 30 restricts a hybrid vehicle from travelling. When being restricted from travelling, the hybrid vehicle is decelerated using an acceleration and deceleration device (not illustrated) and the ECU 20 continues the driving of the gas turbine 10.

Next, the operation the electromotive force device 1 according to the present embodiment will be described. Prior to the description of the operation of the electromotive force device 1, the relationship between travelling which uses electricity charged in the battery 2 without starting the gas turbine 10 (hereinafter, referred to as "EV travelling") and travelling where the gas turbine 10 starts will be described first.

Here, a hybrid vehicle will be described: in a hybrid vehicle capable of travelling 250 km by EV travelling, the 10 kW gas turbine 10 which contains fuel enabling the vehicle to travel 250 km is mounted and the cruising distance thereof is 500 km. In addition, it is assumed that the hybrid vehicle can travel 10 km with an amount of battery energy of 1 kWh. At this time, in order for the vehicle to travel 250 km by EV travelling, the battery 2 should have a usable energy amount of 25 kWh.

When electric vehicles, including the hybrid vehicle, travel in by EV travelling, batteries are not used in the entire SOC range of 100% to 0% but used in the SOC range of, for example, 80% to 30%. Therefore, in the present embodiment, an example where the battery is used in the SOC range of 80% to 30% will be described. Therefore, the actual energy amount of the battery 2 described herein is 50 kWh and 25 kWh thereof is used for by EV travelling.

In addition, when the SOC of the battery 2 is less than 30%, the hybrid vehicle is restricted from travelling. Accordingly, the battery 2 and the gas turbine 10 cannot exhibit the travelling performance completely and thus the cruising distance is reduced. Therefore, in order to obtain the maximum cruising distance, it is necessary that the hybrid vehicle travels without being restricted from travelling. Therefore, in the present embodiment, the target SOC is 30% which is the minimum state of charge in the battery 2. The start timing of the gas turbine 10 is set such that the SOC does not fall below the target SOC.

Figure 4:
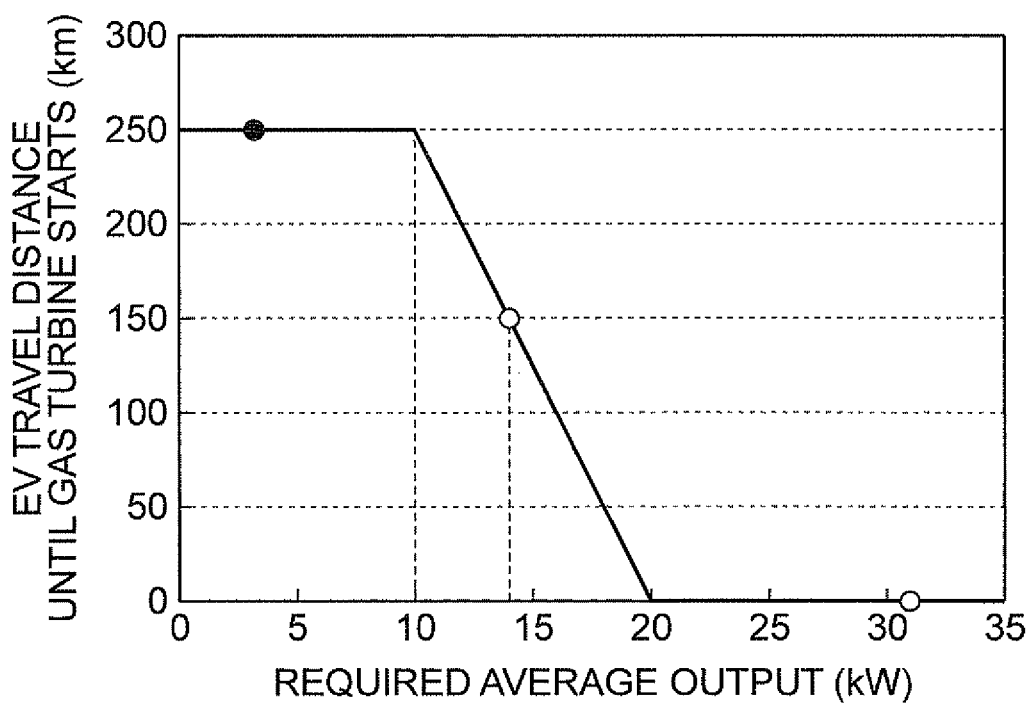
FIG. 4 is a graph illustrating the relationship between an EV travelling distance and a required average output until a gas turbine starts.

Next, preconditions when the start timing of the gas turbine 10 is set will be described with reference to FIG. 4. In FIG. 4, the vertical axis represents a distance that the vehicle can travel by EV travelling until the gas turbine 10 starts and the horizontal axis represents a required average output. In the present embodiment, a necessary electrical power for travelling which is required for the vehicle to travel is acquired on the basis of the required average output. The necessary electrical power for travelling can be replaced with the required average output. Therefore, here, the required average output is used as the necessary electrical power for travelling.

As illustrated in FIG. 4, when the required average output is equal to or less than 10 kW, the vehicle can travel 250 km by EV travelling. For example, the required average output in the LA4 mode is about 4 kW. Therefore, in the case of travelling in the LA4 mode, the vehicle can travel without being restricted from travelling even when the gas turbine starts after the vehicle travels 250 km by EV travelling.

In addition, a case where the required average output is more than 10 kW and equal to or less than 20 kW will be described. For example, when this vehicle normally travels at 100 km/h, the required average output is about 14 kW. In this case, by starting the gas turbine after the vehicle travels 150 km by EV travelling, the vehicle can travel without being restricted from travelling. At this time, the vehicle cannot actually travel 150 km, and by starting the gas turbine after 15 kWh of battery electrical power is consumed, the same travelling performance as that of an EV vehicle with a cruising distance of 500 km (hereinafter, referred to as "a pure EV vehicle") can be exhibited.

For example, in the pure EV vehicle with a cruising distance of 500 km, the battery can use an energy amount of 50 kWh. Therefore, when travelling with 14 kW, the vehicle can travel for 3.57 hours as seen from the following expression (1).

$$50 \text{ kWh}/14 \text{ kW}=3.57 \text{ h} \quad (1)$$

On the other hand, the hybrid vehicle mounting the gas turbine 10 first travels 150 km by EV travelling using 15 kWh in the energy amount of the battery 2 and then travels by starting the gas turbine 10. In this case, the travelling time is 1.07 hours by EV travelling as seen from the following expression (2) and 2.5 hours after starting the gas turbine 10 as seen from the following expression (3). Accordingly, the time for which the vehicle can travel is 3.57 hours and is the same as that of a pure EV vehicle with a cruising distance of 500 km.

$$15 \text{ kWh}/14 \text{ kW}=1.07 \text{ h} \quad (2)$$

$$(25-15)\text{kWh}/(14-10)\text{kW}=2.50 \text{ h} \quad (3)$$

At this time, when the required average output is more than 10 kW and less than 20 kW, the EV travelling distance L until the gas turbine starts can be expressed using the required average output D as in the following expression (4).

$$L=-25D+500 \quad (4)$$

On the other hand, when the required average output is more than 20 kW, the hybrid vehicle is restricted from travelling even when the gas turbine 10 starts immediately after travelling starts. For example, it can be seen from the following expression (5) that the pure EV vehicle can travel for 2 hours when the required average output is 25 kW.

$$50 \text{ kWh}/25 \text{ kW}=2.00 \text{ h} \quad (5)$$

On the other hand, as expressed by the following expression (6), the hybrid vehicle mounting the gas turbine 10 can travel for 1.67 hours with 25 kW even when the gas turbine 10 starts immediately after travelling starts. Therefore, the vehicle is restricted from travelling thereafter.

$$25 \text{ kWh}/(25-10)\text{kW}=1.67 \text{ h} \quad (6)$$

Figure 5:
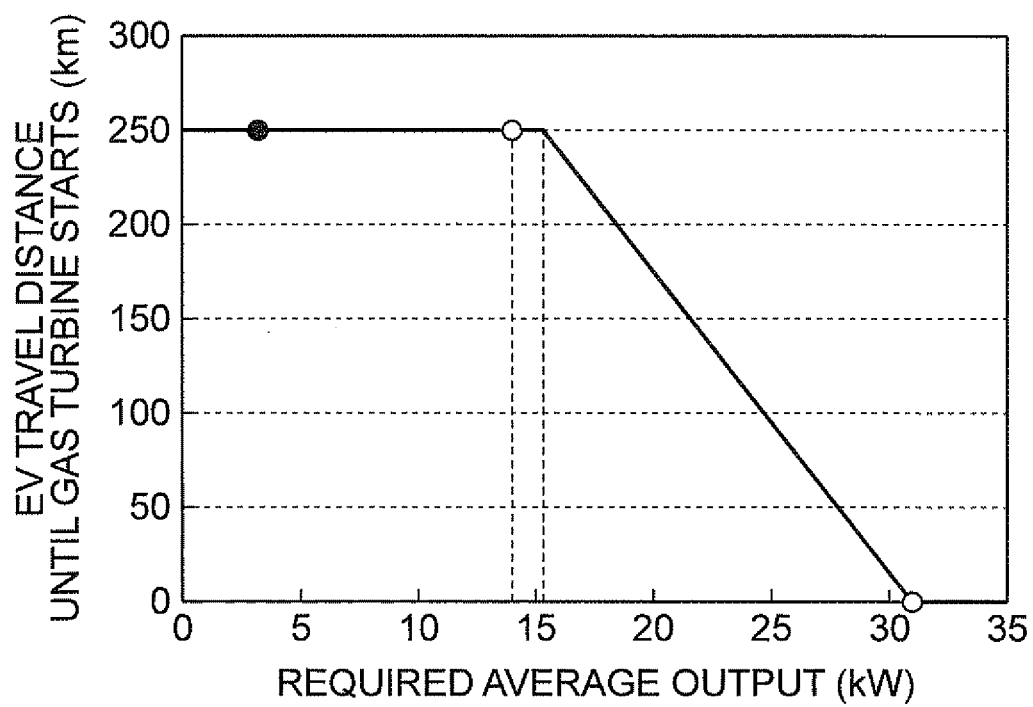
FIG. 5 is a graph illustrating the relationship between the EV travelling distance and the required average output until the gas turbine starts in a case where the output of the gas turbine increases.

Here, in order for the vehicle not to be restricted from travelling, a gas turbine having a large output energy can be used as the gas turbine 10. For example, as illustrated in FIG. 5, when the required average output is 31 kW, the same performance as that of a pure EV vehicle with a cruising distance of 500 km can be obtained by mounting a 15.5 kW gas turbine. However, the size of the gas turbine increases in this case. Therefore, when a reduction in the size of the gas turbine is emphasized, an aspect in which the vehicle is allowed to be restricted from travelling can be employed.

In this way, the same cruising distance as that of a pure EV vehicle can be obtained by the relationship between the required average output and the EV travelling distance until the gas turbine starts. Therefore, by effectively driving the gas turbine 10, the hybrid vehicle can travel efficiently.

Figure 6:
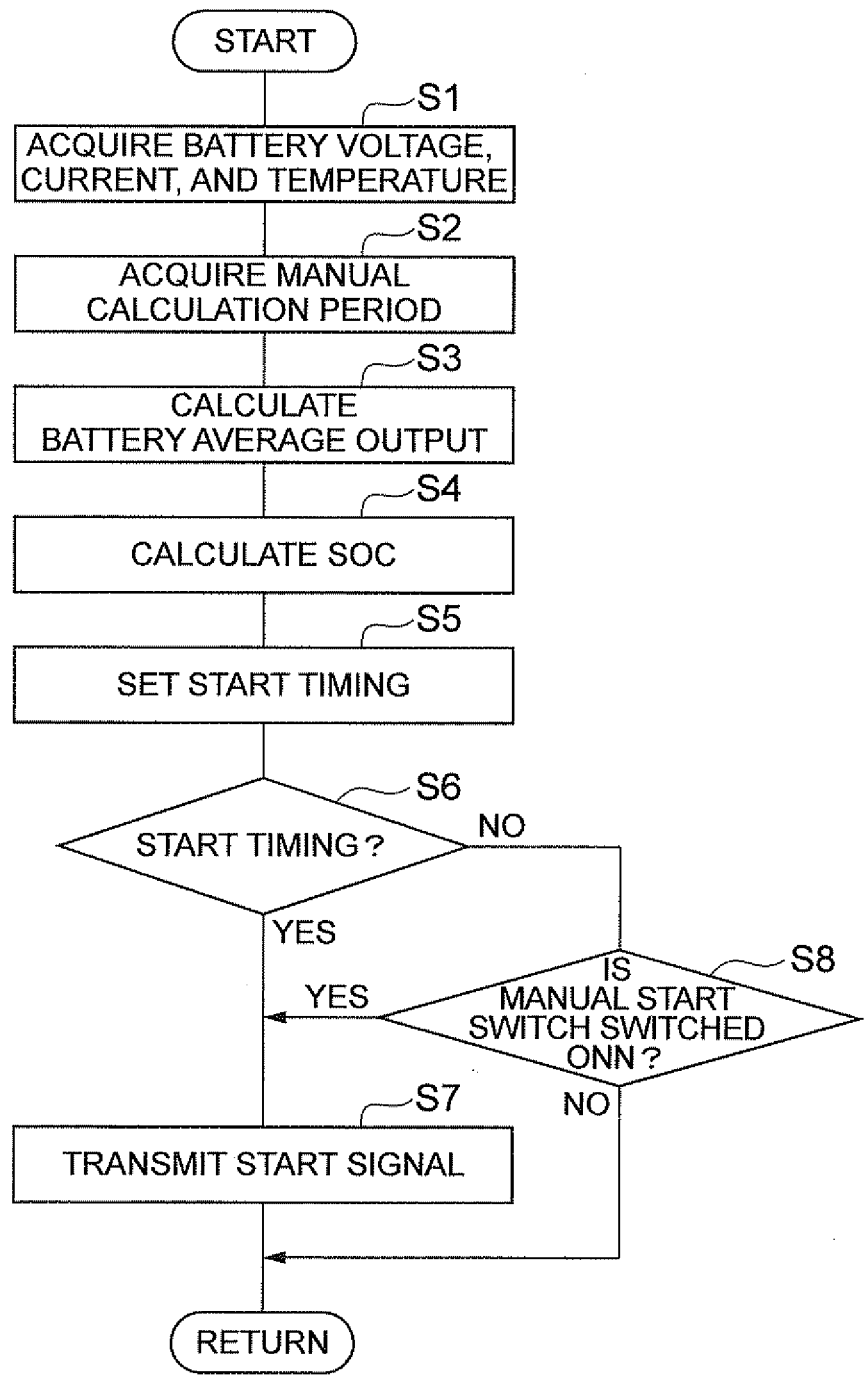
FIG. 6 is a flowchart illustrating the procedure of a start control device.

Under the preconditions, the procedure of the start control device 30 in the electromotive force device 1 according to the present embodiment will be described. FIG. 6 is a flowchart illustrating the procedure of the start control device. As illustrated in FIG. 6, first of all, the start control device 30 acquires the battery voltage supplied from the battery voltmeter 21, the battery current supplied from the battery ammeter 22, and the battery temperature supplied from the battery thermometer 23 (S1).

Next, the battery average output calculation unit 31 acquires a manual calculation period set by the manual calculation period setting dial 41 (S2). Next, the battery average output calculation unit 31 calculates the battery average output (S3). When the battery average output is calculated, the battery average output calculation unit 31 calculates the battery output from the battery current and the battery voltage and calculates the average value of the battery output during the set manual calculation period as the battery output average. The battery output average is calculated to include power running and regeneration.

As the manual setting period, a period from when the key is turned on and the vehicle starts driving to the present time or a period from the present time to a predetermined given time can be set. It is assumed that the battery output is changed as illustrated in FIG. 7(b). Here, when the set manual calculation period is the period from when the key is turned on and the vehicle starts driving to the present time, the average value of the battery output in a first calculation period P1 is calculated as the battery output average. When the set manual calculation period is the period from the present time to the predetermined given time, the average value of the battery output in a second calculation period P2 is calculated as the battery output average.

After the battery output average is calculated in this way, the SOC calculation unit 32 calculates the SOC of the battery 2 (S4). The SOC of the battery 2 is calculated on the basis of the battery voltage, the battery current, and the battery temperature which are transmitted from the battery voltmeter 21, the battery ammeter 22, and the battery thermometer 23. The SOC of the battery 2 is gradually decreased as a whole while repeating small increases and decreases, for example, as illustrated in FIG. 7(a), by the travelling of the hybrid vehicle and the regeneration of the motor 4.

After calculating the SOC of the battery 2, the start timing of the gas turbine 10 is set (S5). When the start timing of the gas turbine 10 is set, the battery average output calculated in S3 and the SOC calculated in the step S4 is referred to the start timing setting map illustrated in FIG. 3. Then, it is determined whether or not timing is the start timing (S6). In the determination of whether or not timing is the start timing, when a point plotted by the battery average output (required average output) and the SOC is on the upper right side from the determination reference line J, it is determined that the gas turbine 10 should start.

As a result, when the timing is the start timing, the start signal is transmitted to the ECU 20 (S7) to finish the process of the start control device 30. The ECU 20 to which the start signal is transmitted from the start control device 30 starts the gas turbine 10. In this way, electricity is supplied to the battery 2 and the inverter 3.

On the other hand, when the timing is not the start timing, it is determined whether or not the manual start switch 42 is switched on (S8). Here, when the manual start switch is switched on, the driver's intention takes precedence. Therefore, the start signal is transmitted to the ECU 20 irrespective of the start timing. In this way, the process of the start control device 30 is finished. On the other hand, when the manual start switch 42 is not switched on, the process of the start control device 30 is finished as is.

In this way, the electromotive force device 1 according to the present embodiment sets the start timing of the gas turbine 10 on the basis of the SOC of the battery 2, the preset target SOC, the necessary electrical power for travelling calculated from the required average output of the hybrid vehicle, and the electrical power as the rated output of the gas turbine 10. Therefore, the start timing to charge the battery 2 by the start of the gas turbine 10 is determined according to the SOC of the battery 2 and the electrical power necessary for hybrid travel. Therefore, by mounting the electromotive force device to the hybrid vehicle or the like, the gas turbine 10 can be effectively driven and thus the vehicle can travel efficiently.

In addition, since the necessary electrical power for travelling is calculated from the required average output, the necessary electrical power for travelling can be easily calculated. Furthermore, when a point plotted by the battery average output, the required average output, and the SOC is on the upper right side from the determination reference line J, it is determined that timing is the start timing when the gas turbine 10 should start. Therefore, the start timing can be easily set.

Next, a second embodiment of the present invention will be described. FIG. 8 is a block diagram illustrating a configuration of a start control device of an electromotive force device according to the present embodiment. As illustrated in FIG. 8, an electromotive force device 30 according to the present embodiment is different from the above-described first embodiment mainly in that a battery average current calculation unit 34 is provided instead of the battery average output calculation unit 31. In the electromotive force device according to the present embodiment, a battery current value is acquired as the battery output.

The battery ammeter 22 and the manual calculation period setting dial 41 are connected to the battery average current calculation unit 34. The manual calculation period setting dial 41 can set the measurement time of a battery current so as to calculate a battery average current. The battery average current calculation unit 34 calculates the battery average current using the battery current transmitted from the battery ammeter 22 at a time set by the manual calculation period setting dial 41. The battery average current calculation unit 34 outputs the calculated battery average current to the start timing setting unit 33.

The start timing setting unit 33 performs the same process as above using the battery average current instead of the battery average output according to the above-described first embodiment. In the present embodiment, the start timing setting unit 33 of the start control device 30 stores the start timing setting map illustrated in FIG. 9. The start timing setting map illustrated in FIG. 9 is a drawing in which the horizontal axis represents the battery average current instead of the required average output in the start timing setting map illustrated in FIG. 3.

In addition, similar to the case of the first embodiment, in order for the hybrid vehicle not to be restricted from travelling, a gas turbine having a large output energy can be used as the gas turbine 10. For example, when the required average output is 31 kW, the same performance as that of a pure EV vehicle with a cruising distance of 500 km can be obtained by mounting a 15.5 kW gas turbine.

The electromotive force device according to the present embodiment sets the start timing of the battery on the basis of the battery average current and the SOC. In the electromotive force device according to the present embodiment, the necessary electrical power for travelling can be replaced with the battery average current. Therefore, in the present embodiment, the required average output is used as the necessary electrical power for travelling.

In addition, the process of the start control device 30 according to the present embodiment is also performed in the same way as that of the start control device 30 according to the above-described first embodiment, except that the required average output is replaced with the battery average current.

In this way, similar to the case of the above-described first embodiment, the electromotive force device according to the present embodiment acquires the start timing of the gas turbine 10 on the basis of the SOC of the battery 2, the preset target SOC, the necessary electrical power calculated from the required average output of the hybrid vehicle, and the electrical power as the rated output of the gas turbine 10. Therefore, the start timing to charge the battery 2 by the start of the gas turbine 10 is determined according to the SOC of the battery 2 and the electrical power necessary for hybrid travel. Therefore, by mounting the electromotive force device to the hybrid vehicle or the like, the gas turbine 10 can be effectively driven and thus the vehicle can travel efficiently.

In the present embodiment, the battery output value is acquired as an output value of the battery, but an aspect in which a voltage value or an electrical power value is acquired as an output value of the battery can be employed.

Next, a third embodiment of the present invention will be described. FIG. 10 is a block diagram illustrating a configuration of a start control device of an electromotive force device according to the third embodiment. As illustrated in FIG. 10, the electromotive force device 1 according to the present embodiment includes a navigation device 5 and a start control device 50, and the navigation device 5 is connected to the start control device 50.

In addition, the start control device 50 includes a road information analysis unit 51, a SOC calculation unit 52, a future battery output and SOC estimation unit 53, and a start timing setting unit 54. Furthermore, similar to the case of the above-described first embodiment, the battery voltmeter 21, the battery ammeter 22, and the battery thermometer 23, and the manual start switch 42 are connected to the start control device 50. These configurations are the same as those of the above-described first embodiment.

The navigation device 5 is a device of measuring the current position of a vehicle by GPS (Global Positioning System) and the like. In addition, the navigation device 5 stores map information and includes destination setting means for setting a destination after the vehicle travels. When the destination is set, the navigation device 5 transmits the map information from the current position to the destination to the start control device 50. The map information transmitted from the navigation device 5 includes information pertaining to the shape and state of a road such as the distance from the current position to the destination, upward and downward slopes in a road, a curve R when there is a curve, or road type including express highways and public highways.

The road information analysis unit 51 of the start control device 50 analyzes the shape and state of a road until a hybrid vehicle arrives at the destination, on the basis of the map information transmitted from the navigation device 5. The road information analysis unit 51 outputs road shape and state information pertaining to the analyzed road shape and state to the future battery output and SOC estimation unit 53.

The future battery output and SOC estimation unit 53 outputs the SOC calculated by the SOC calculation unit 52 in addition to the road shape and state information output from the road information analysis unit 51. The future battery output and SOC estimation unit 53 generates a travel plan on the basis of the output road shape and state information and the SOC.

The future battery output and SOC estimation unit 53 estimates a future battery output on the basis of the road shape and state information output from the road information analysis unit 51. Furthermore, the future battery output and SOC estimation unit 53 estimates a future SOC of the hybrid vehicle on the basis of the estimated future battery output and the SOC output from the SOC calculation unit 52.

As the future battery output, the change over time of the battery output from the current position to the destination is estimated, for example, as illustrated in FIG. 11($b$). Here, the regeneration by the motor 4 contributes to a zone where the battery output is a negative value. In addition, a reduction amount of SOC can be estimated according to the change over time of the battery output set herein. By subtracting the reduction amount from the current value of SOC output from the SOC calculation unit 52, the future SOC is estimated. The future battery output and SOC estimation unit 53 outputs the estimated future SOC to the start timing setting unit 54.

The start timing setting unit 54 sets the start timing of the gas turbine 10 on the basis of the future SOC output from the future battery output and SOC estimation unit 53. The start timing setting unit 54 sets the start timing of the gas turbine 10. Here, the change over time of the SOC in a case where the battery output changes over time as illustrated in, for example, FIG. 11($b$), is illustrated in FIG. 11($a$). When the future SOC does not reach the minimum SOC until the destination as described above, the gas turbine 10 does not start.

In addition, when the battery output changes over time as illustrated in FIG. 12($b$), the future SOC reaches the minimum SOC without starting the gas turbine 10 until the hybrid vehicle arrives at the destination in some cases, as indicated by the solid line of FIG. 12($a$). In these cases, the hybrid vehicle is restricted from travelling. When the hybrid vehicle is restricted from travelling, the travelling performance cannot be sufficiently exhibited.

Therefore, the future SOC is calculated again assuming that the gas turbine 10 starts at, for example, a second timing T2. In this case, as indicated by the chain line of FIG. 12($a$), the future SOC reaches the minimum SOC. In this case, the future SOC is calculated again assuming that the gas turbine 10 starts at, for example, a first timing T1. In this case, as indicated by the broken line of FIG. 12($a$), the hybrid vehicle arrives at the destination without the future SOC reaching the minimum SOC.

In addition, it is assumed that the destination is provided with, for example, charging equipment in a household power supply or commercial facilities. In this case, there is a possibility where the vehicle can travel using the SOC charged in the battery 2 when the SOC is not the minimum SOC at the time of arrival at the destination, which is disadvantageous in terms of effective energy usage. Therefore, the start timing of the gas turbine 10 is set such that the SOC of the battery 2 reaches the minimum SOC at the time of arrival at the destination.

In addition, when it is determined that the timing is the timing when the gas turbine 10 should start, the start timing setting unit 54 transmits the start signal to the ECU 20. Furthermore, when the current SOC output from the SOC calculation unit 52 is already equal to or less than the minimum SOC, or when the manual start switch 42 is switched on, the start signal is immediately output to the ECU 20. The other configurations are the same as in the above-described first embodiment.

The electromotive force device having the above-described configurations according to the present embodiment sets the start timing of the gas turbine 10 on the basis of the future SOC set according to the travel plan based on the road shape and state information. Accordingly, the start timing to charge the battery 2 by the start of the gas turbine 10 is determined according to the SOC of the battery 2 and the electrical power necessary for hybrid travel. Therefore, by mounting the electromotive force device to the hybrid vehicle or the like, the gas turbine 10 can be effectively driven and thus the vehicle can travel efficiently.

In addition, the electromotive force device according to the present embodiment sets the start timing of the gas turbine 10 such that the future SOC does not reach the minimum SOC. Therefore, the travelling performance of the hybrid vehicle can be sufficiently exhibited. Furthermore, the electromotive force device according to the present embodiment sets the start timing of the gas turbine 10 such that the SOC reaches the minimum SOC when the vehicle arrives at the destination provided with charging equipment for the battery 2. The energy of the battery 2 can be used effectively.

Here, the comparison with the case where the gas turbine 10 does not start will be described with reference to FIG. 13. As indicated by the solid line of FIG. 13, when the hybrid vehicle travels only by EV travelling, the SOC of the battery 2 is the minimum SOC at a time T3 and the vehicle arrives at the destination at a time T4. In this case, assuming that the average power required for travelling from the time T3 to the time T4 is larger than the rated output of the gas turbine 10, when the gas turbine 10 starts at the time T3, the vehicle is restricted from travelling from the time T3 to the time T4. In this way, when the gas turbine 10 starts at the time T3, there may be a case where the travelling performance cannot be sufficiently exhibited.

On the other hand, the electromotive force device according to the present embodiment calculates the battery output on the basis of the travel plan up to the destination as indicated by the broken line of FIG. 13 and determines the start timing of the gas turbine 10 such that the SOC reaches the minimum SOC at the destination. Therefore, the travelling performance can be sufficiently exhibited and the energy of the battery 2 can be effectively used. However, in the present embodiment, when the average power require for travelling from the time T3 to the time T4 is smaller than the rated output of the gas turbine 10, the start timing of the gas turbine 10 is the time T3.

Hereinabove, the preferred embodiments of the present invention have been described, but the present invention is not limited to the above-described embodiments. For example, in the above-described embodiments, the gas turbine 10 is used as the internal combustion engine, but other internal combustion engines such as a reciprocating engine can be used. In addition, in the above-described embodiments, the manual start switch 42 is provided, but an aspect in which the manual start switch 42 is not provided can be employed. Furthermore, in the above-described third embodiment, the road plan is generated to calculate the future battery output and the future SOC. However, an aspect in which the battery average output is calculated from the future battery output and the start timing of the gas turbine is set according to the same procedure as that of the first embodiment can be employed.

INDUSTRIAL APPLICABILITY

The present invention relates to an electromotive force device and, in particular, can be used as an electromotive force device mounted to a hybrid vehicle or the like.

REFERENCE SIGNS LIST

1 electromotive force device
2 battery
3 inverter
4 motor
5 navigation device
10 gas turbine
11 turbine
11A rotating shaft
12 combustor
13 compressor
14 heat exchanger
17 power generator
18 rectifier
20 ECU
21 battery voltmeter
22 battery ammeter
23 battery thermometer
30, 50 start control device
31 battery average output calculation unit
32, 52 SOC calculation unit
33, 54 start timing setting unit
34 battery average current calculation unit
41 manual calculation period setting dial
42 manual start switch
51 road information analysis unit
53 future battery output and SOC estimation unit
J determination reference line
P1 first calculation period
P2 second calculation period
T1 first timing
T2 second timing

The invention claimed is:

1. An electromotive force device mounted to a vehicle, the vehicle including an internal combustion engine, a power generator that generates electricity driven by the internal combustion engine, and a secondary battery to which the electricity generated by the power generator is supplied, the device comprising:

an SOC acquisition unit for acquiring an SOC of the secondary battery;

a travelling restriction unit for vehicle from travelling when the vehicle is travelling using electricity from the secondary battery and the SOC of the secondary battery acquired by the SOC acquisition unit is below a minimum SOC of the secondary battery;

a target SOC acquisition unit for acquiring a target SOC that is the minimum SOC of he secondary battery;

an estimation unit for analyzing a shape and state of a road until the vehicle arrives at a destination on the basis of map information from a current vehicle position to the destination and for outputting information pertaining to the analyzed shape and state of the road, estimating a future battery output the basis of the information pertaining to the analyzed shape and state of the road, estimating a decrease in an amount of SOC from a current vehicle position to the destination on the basis of the future battery output, and estimating a future SOC on the basis of the estimated decrease in the amount of SOC and the SOC of the secondary battery acquired by the SOC acquisition unit at the current vehicle position;

an electromotive an electromotive force value acquisition unit for acquiring an electromotive force value generated by the power generator; and a charge start timing determination unit for determining a start timing that is a timing to start the internal combustion engine for charging the secondary battery, wherein the charge start timing determination unit determines whether the future SOC will reach the target SOC before the vehicle arrives at the destination on the basis of the target SOC acquired by the target SOC acquisition unit at the current vehicle position, and wherein when the charge start timing determination unit determines the future SOC will reach the target SOC before the vehicle arrives at the destination without starting the internal combustion engine, the charge start timing determination unit determines the start timing to start the internal combustion engine such that the future SOC will not reach the target SOC before the vehicle arrives at the destination, on the basis of the SOC of the secondary battery acquired by the SOC acquisition unit at the current vehicle position, the target SOC acquired by the target SOC acquisition unit at the current vehicle position, the decrease in amount of SOC estimated by the estimation unit, and the electromotive force value of the power generator acquired by the electromotive force value acquisition unit.

2. The electromotive force device according to claim 1, further comprising:
an electrical power consumption plan generating unit for generating an electrical power consumption plan for up to arriving at a charging area on the basis of road information acquired by a road information acquisition unit,
wherein the charge start timing determination unit determines the charge start timing on the basis of the electrical power consumption plan.

3. The electromotive force device according to claim 1,
wherein the vehicle is provided with a charge start switch which can be manipulated by a passenger, and
the charge start timing determination unit preferentially determines timing when the charge start switch is switched on, as the charge start timing.

4. A hybrid vehicle comprising:
the electromotive force device according to claim 1,
the secondary battery; and
an electric motor that drives a drive wheel using electricity supplied from the secondary battery.

* * * * *